A. BRIDGES.
TRUSS PAD.

No. 41,362. Patented Jan. 26, 1864.

UNITED STATES PATENT OFFICE.

ALBERT BRIDGES, OF JERSEY CITY, NEW JERSEY.

IMPROVEMENT IN TRUSS-PADS.

Specification forming part of Letters Patent No. 41,362, dated January 26, 1864.

*To all whom it may concern:*

Be it known that I, ALBERT BRIDGES, of Jersey City, in the county of Hudson and State of New Jersey, have invented, made, and applied to use a certain new and useful Improvement in Pads for Trusses; and I do hereby declare the following to be a full, clear, and exact description of my said invention, reference being had to the annexed drawings, making part of this specification, wherein—

Figure 1:
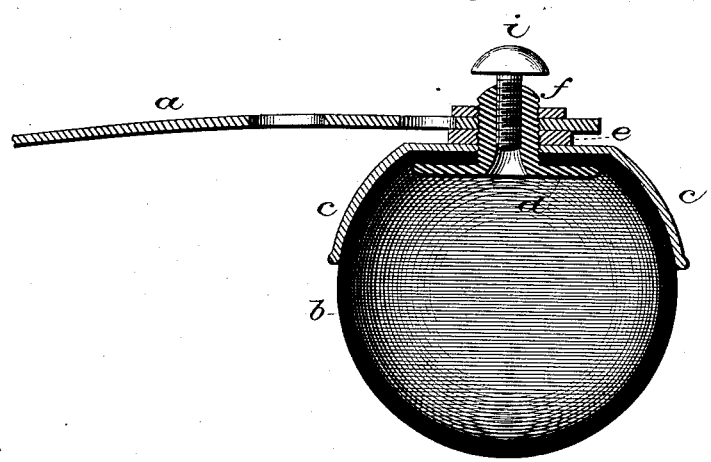
Figure 2:
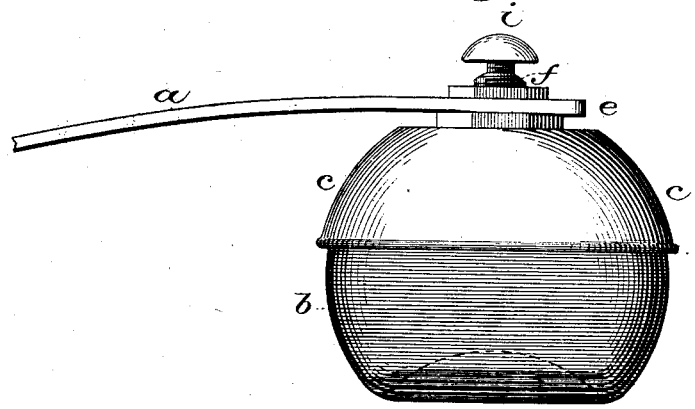

Figure 1 is a section of my pad, and Fig. 2 is a side view of the same in the form in which said pad would be compressed.

Similar marks of reference indicate the same parts.

Various kinds of pads have been made for ruptures, and a rigid surface has in many instances been considered indispensable. In most ruptures the intestines as they press forward tend to enlarge the rupture by acting against the side of the cavity as they come in contact with the rigid substance composing the pad; hence such pads as have heretofore generally been used tend to produce an increase in the size of the hernia or a change in its position. Hollow non-perforated balls have also been employed; but they have not been provided with any cap or similar means for preventing the ball turning toward one side and taking a bearing upon a part of the ball nearer to the point where the spring has been attached.

The nature of my said invention consists in a perforated elastic hollow ball securely attached in a peculiar manner to the truss-spring, so that the ball cannot be separated or lose its elasticity, and the ball sets within a cap that insures the correct position of said pad on the rupture and prevents the ball turning sidewise in use. I am also able by my peculiar construction of pad to regulate the elasticity of the same with great facility.

In the drawings, $a$ represents part of a truss-spring or other device for attaching or applying the pad.

$b$ is the pad itself, which I have shown as globular; but it may be any other desired shape. The pad is made of india-rubber or other suitable material and is hollow and elastic.

$c$ is a metal cap to sustain the pad and form the connection to the spring through the agency of the headed pin $d$, inserted from the inside of the ball through the spring or other part $a$. I have shown this headed pin as introduced through the hole in the rubber ball, which can easily be done by stretching the same, if the ball is of india-rubber; and $e$ is a washer screwed on $d$, confining the cap and ball together air-tight; and $f$ is a nut on $d$ to retain $a$. The pin $d$ is hollow, and provided with a screw, $i$, that can be screwed air-tight against a little washer under its head. If the screw $i$ is removed, the pad will only act by its own elastic force. If the screw $i$ is inserted when the ball is distended, the elasticity of the confined air will render the ball or pad harder, and if the air is expelled by pressing in the pad previous to screwing down $i$, then the vacuum will cause the pad to be softer than in its normal state. Thus the pressure or rigidity of the pad is entirely under control. In all instances this pad, when placed over the rupture, gives more pressure around the edges than in the center, and the yielding of the pad under pressure tends to draw the sides of the rupture together. At the same time the ball shape will project slightly, as in Fig. 2, into the cavity itself and take the strain of the intestines and yield as they may protrude, causing a depression in the pad that prevents any tendency of the intestines to crowd against the side of the rupture and escape at the side of the pad, and the yielding of the hollow elastic pad does not tend to make it slip off the rupture but rather more to center it over the same in case it may have slipped or been misplaced, and the elasticity of the pad allows the body to move when walking or otherwise without any tendency to move the pad and without any disagreeable sensation or strain on the parts.

What I claim, and desire to secure by Letters Patent, is—

1. Attaching the hollow elastic ball to the truss-spring by means of the headed pin $d$ and screw-nuts $e$ and $f$, the head of said pin being introduced within the ball, as specified, and in combination with the elastic ball and pin $d$.

2. The cap $c$, for the purpose of retaining the ball in its proper position, as specified.

3. Regulating the elasticity of the hollow pad by the action of the air confined within it by the screw $i$, or its equivalent, as set forth.

In witness whereof I have hereunto set my signature this 2d day of May, 1863.

ALBERT BRIDGES.

Witnesses:
 THOS. GEO. HAROLD,
 LEMUEL W. SERRELL.